Dec. 19, 1950         J. A. H. BARKEIJ                2,535,023
     SEMIAUTOMATIC GEARSHIFT TRANSMISSION TOGETHER WITH A
        COMBINED FUEL CONTROL ELEMENT AND MANUAL GEARSHIFTER
Filed June 13, 1941                          5 Sheets-Sheet 1
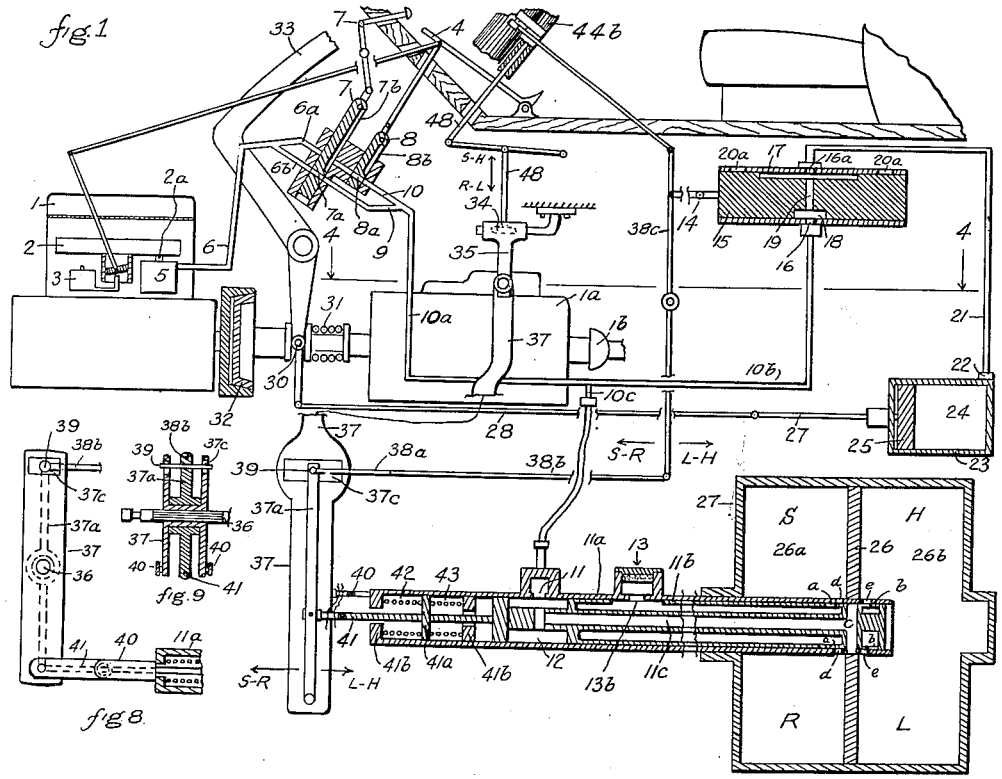
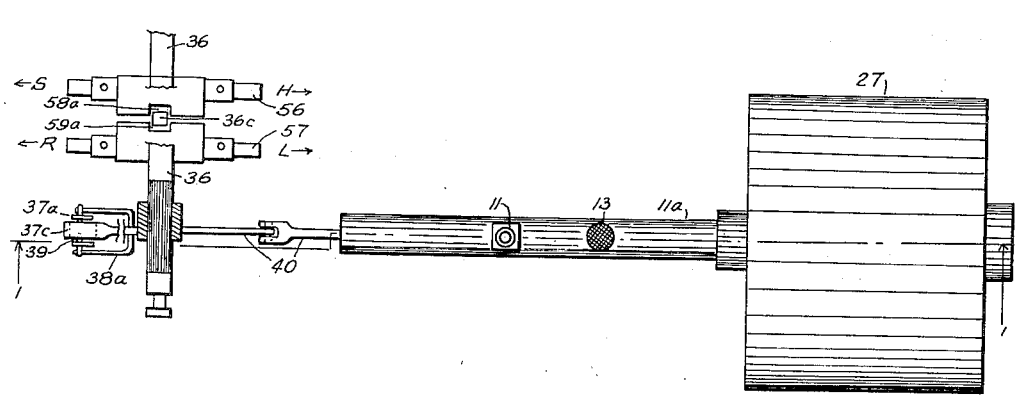
INVENTOR.
J. A. H. Barkeij
BY

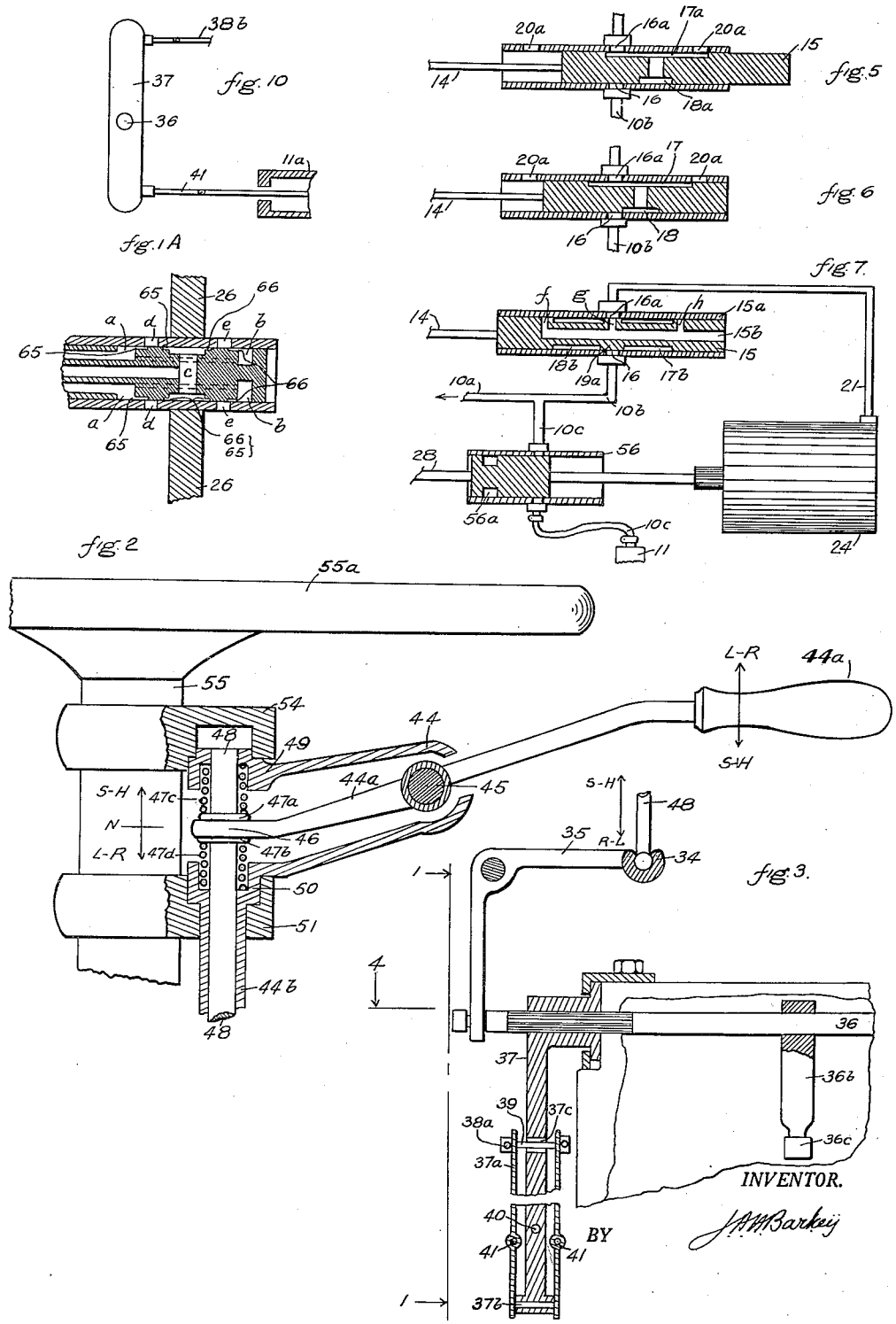

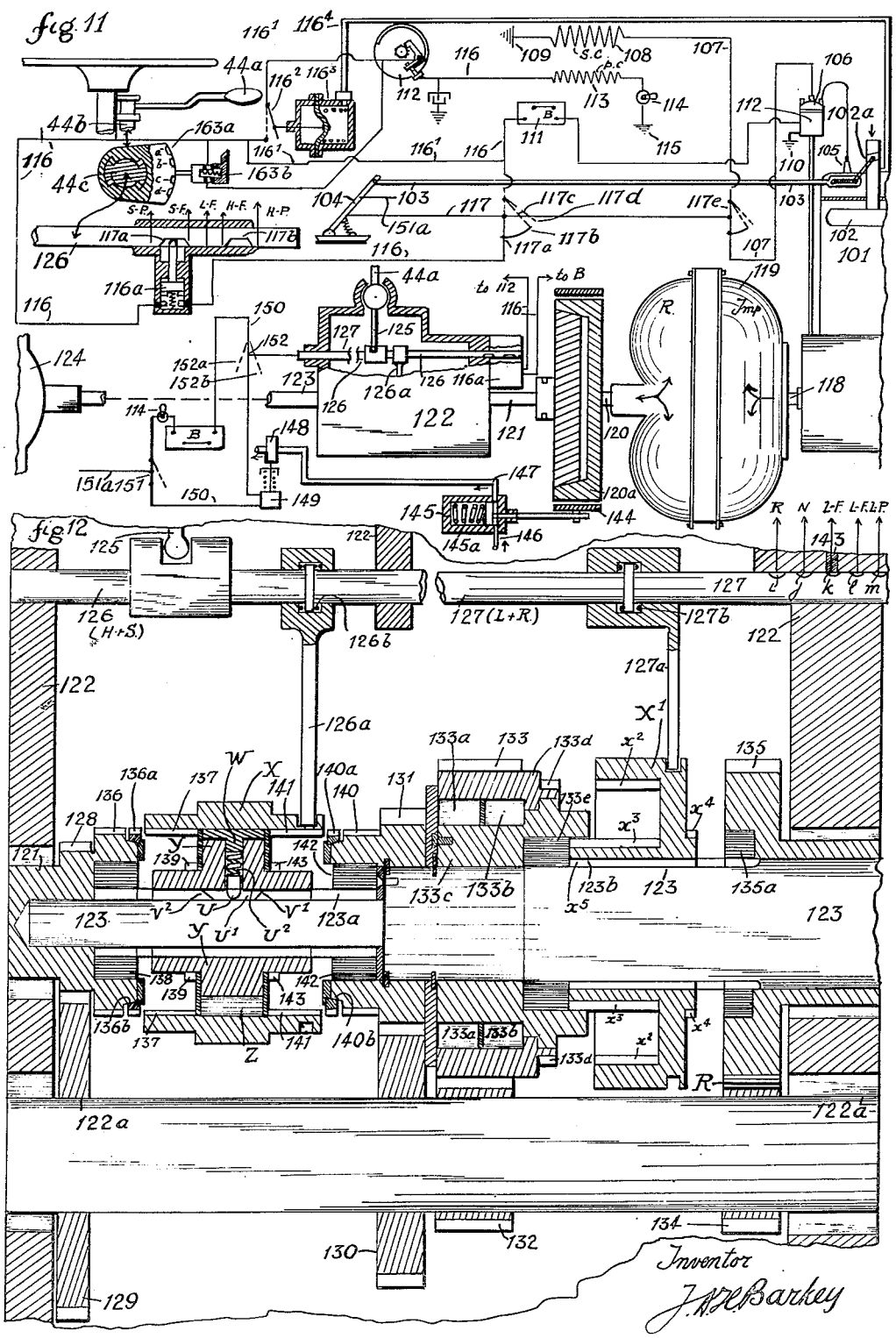

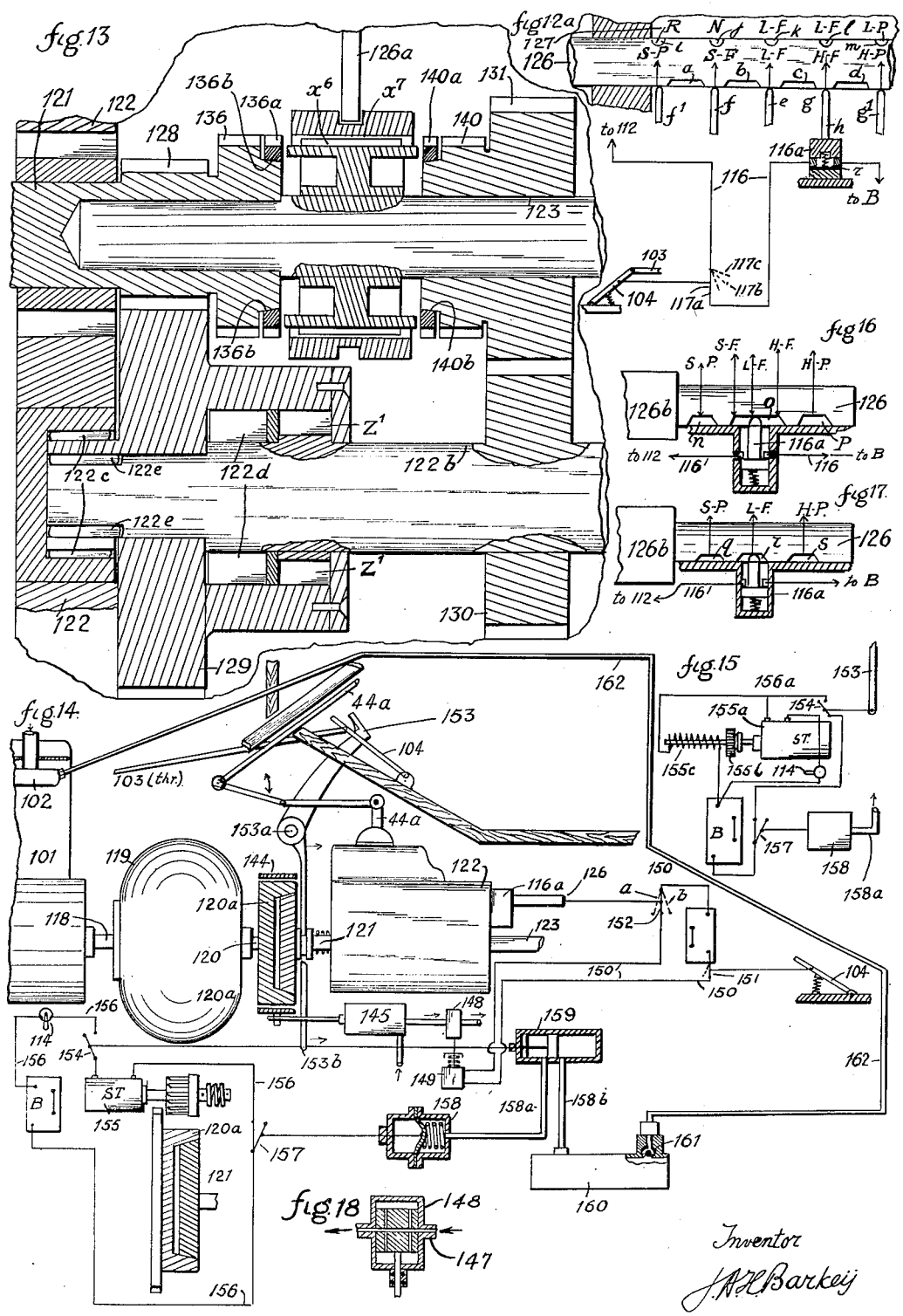

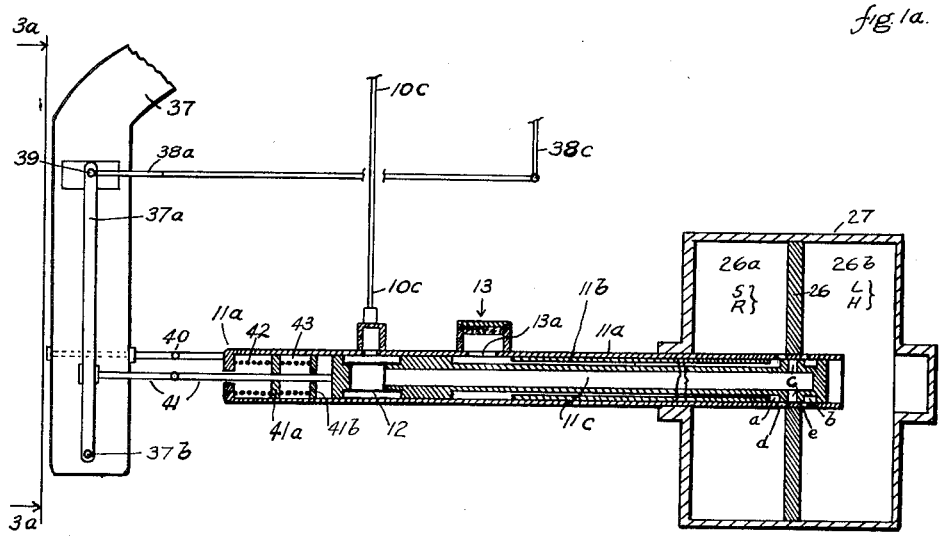
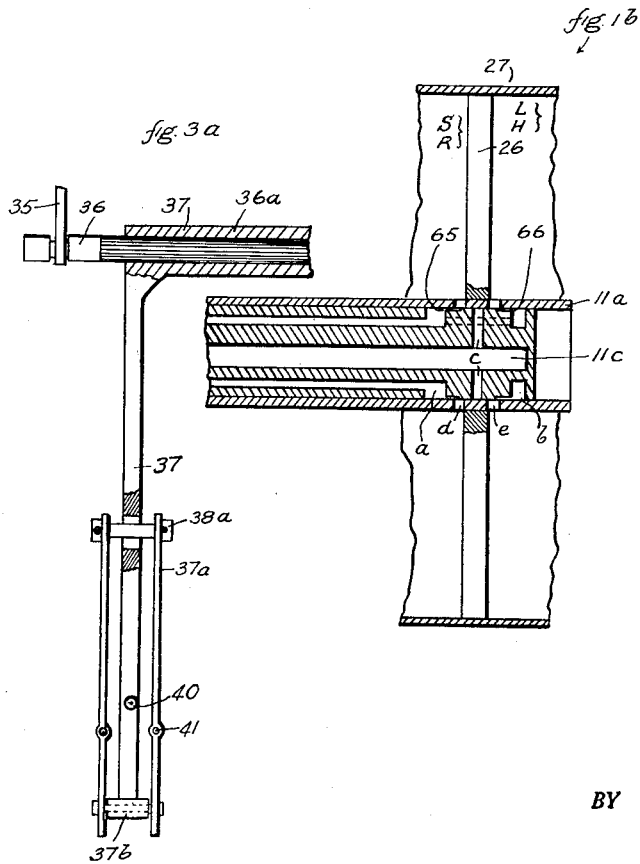

Patented Dec. 19, 1950

2,535,023

UNITED STATES PATENT OFFICE 2,535,023

SEMIAUTOMATIC GEARSHIFT TRANSMISSION TOGETHER WITH A COMBINED FUEL CONTROL ELEMENT AND MANUAL GEAR SHIFTER

Jean A. H. Barkeij, Altadena, Calif.

Application June 13, 1941, Serial No. 399,556

15 Claims. (Cl. 192—.073)

The present application carries forward some of the principles of my prior application No. 676,646 of June 20, 1933, now Patent No. 2,261,-898, of Nov. 4, 1941, and of my prior application No. 128,368 of March 1, 1937, now Patent No. 2,322,411 dated January 22, 1943, and is in some respects also a divisional application thereof.

In the present application, however, the manual gearshift lever is also able to effect the entire gearshift, being a selector valve and gearshift lever in one but being also the controlling element of the engagement and disengagement of the clutch in each of the gearshift positions said manual lever may effect. This gearshift lever is mounted preferably below the steering wheel (which is again customary after a considerable interval) and may be under control of a valve actuated by the accelerator connected with the fuel control element.

A further object is to effect the above functions with the minimum of mechanical complication, and to construct the elements thereof in such functional relation that the operation of the fluid motor, operating the gearshift is preferably not made dependent upon the operation of the vacuum pump for the clutch, in order to make in most cases use of the greater vacuum power available when the throttle of the motor is closed but the engine is still rotating at a speed substantially above idling position, and for reasons to be explained later on.

Another object is to control all the positions and relative functions of the clutch- and gearshift control by means of a single valve, associated indirectly with said manual gearshift lever.

Another modification is shown in the Figures 11 to 17, in which likewise the total gearshift is controlled by the gearshift lever.

Instead of disengaging and engaging a two-way clutch respectively before and after a power shift (or a hand-and-power shift), the gearshift lever here actually disengages the transmission from the engine before a power shift and re-engages it after the shift has been made by means of the torque characteristics of a fluid drive. When cutting off the fuel from an engine driving a transmission through a fluid drive, or cutting temporarily the ignition thereof, the transmission is actually temporarily disengaged or freed from the engine and reversely, and when stepping on the accelerator again or re-establishing the ignition through the accelerator or through the gearshift lever (both are proposed in the following description) the engine is re-engaged with the transmission. The difference is merely a difference in time. Whereas in the first modification the gearshift lever or accelerator may first disengage the transmission from the engine, the subsequent shift may be delayed. In the present modification, however, in which the ignition is temporarily cut off, it stands to reason that the shift has to be made instantly after the accelerator has cut off the ignition, or the gearshift lever has done this. Therefore I prefer in general to have the ignition cut off by the gearshift lever, because the three actuations necessary for a shift will be performed in a single instant by any complete move by the gearshift lever.

In this latter modification, however, I arrange a small vacuum motor in the primary circuit of the ignition, so that when the vacuum falls below a certain minimum, because the cutting off of the ignition has slowed down the engine so much that it is almost killed, the igniton is automatically re-established by said motor, and the gearshift can be attempted all over again by bringing the lever back in the original position when started. This arrangement may be preferable, because a certain backlash or lost motion between the gearshift lever and the shiftable units in the transmission, actually effecting the gearshift, may cause the ignition to be cut off inadvertently too long. Likewise when the accelerator can cut off the ignition, and the driver inadvertently steps on the accelerator, beyond, wide open throttle, too long, the ignition will be automatically re-established. The features will be explained in detail hereinafter.

In the modification of Figures 1 to 10, and in the second modification of Figures 11 to 17, I prefer to use, besdes the two-way clutch, a fluid drive between engine and transmission (as already proposed in my appl. 332,522 of April 29, 1940), now Patent No. 2,410,333 dated October 29, 1946, and a special transmission, as shown in the Figs. 12 and 13, containing either for the freewheel and positive shifts between high and second gear two synchronisation mechanisms for all shifts, as shown in Fig. 12, or a single synchronisation mechanism for shifts between freewheel-second gear and high-positive gear, as shown in Fig. 13.

The transmission of Fig. 12, is a combination of that of my appl. 184,904, now Patent No. 2,255,-738 dated September 9, 1941, and of Fig. 3 of my appl. 676,646 as far as the low gear drive is concerned.

The transmission of Fig. 13, is a combination of that of my appl. 184,904, as far as the shift from second-gear-freewheel to high-gear positive drive is concerned, in combination with the low gear drive of Fig. 3 of my appl. 676,646.

I effect in said two transmissions all forward shifts without the disengagement of the two-way clutch in the arrangement of Figs. 11 to 17, but by cutting off temporarily the ignition. The neutral position between high and second gear in both transmissions does not exist virtually, because in neutral position the low gear drive in freewheel position operates. Although in this gearshift, we have five positions for each shift rod 126 (high and second gear), and 127 (low and reverse gear), the peculiar shifting arrangement of the first ten figures operates just the same for 3 positions as for five positions of each shift rod. For the freewheel shifts of shift rod 126 (or 127) the vacuum pump makes merely a shorter shift and for the solid gear positions it makes a longer, or complete shift.

In the Fig. 12, the freewheel device Z is located in the shiftable unit X (see appl. 184,904), and in the Fig. 13, the freewheel $Z^1$ is between the main gear 129 on the countershaft and the countershaft 122b itself, so that only a freewheel drive can be obtained for second gear.

A further object, already shown in my appl. No. 332,522, is to construct a brake on the runner of the fluid drive, controlled partially by the accelerator, partially by the gearshift lever, to prevent the creeping of the car when standing still, and thereby obviating the use of the car brake, every time the car is stopped.

Another object is to control the interruption of the ignition of the engine by means of the accelerator, when it is pressed down beyond the wide open position.

Another object is to construct an elastic and/or lost-motion relation between the member to interrupt the ignition, and the member actually shifting the gears, both members actuated simultaneously by the gearshift lever 44a.

Another object is to start the engine by means of an electric starter, controlled partially by the operation of the two-way clutch 120a, and partially controlled by the vacuum of the engine when it is running.

Other objects will appear during the description of the following figures.

In the drawings I show preferred embodiments of my invention and applicant is well aware of the fact that the same may be greatly varied and yet accomplish not more nor less than can be accomplished with the present form, and further that many equivalents could be constructed.

Fig. 1 is a general diagrammatic drawing representing an engine, clutch and gearbox, and shifting means, which may manually effect all the gearshifts of which said gearbox is capable of, and which manual shifting means at the same time control the clutch (see section line 1—1 of Fig. 3 and Fig. 4) by means of a valve 15—17—18—19 and control the gearshift by means of a valve 11a and 11b, 11c.

Fig. 1A is a modification thereof as already disclosed in Patent 2,261,898 of Nov. 4, 1941, Figs. 5 to 10.

Fig. 1a shows the lower end of the arm 37 of Fig. 1 shifting the gears in gearbox 1a, and shows that the fulcrum 37b is placed between the arms 37 and 37a at their lower end, so that the sliding valve 11b—c moves by the gearshift lever 44a in the same direction as this sliding valve is moved in the shell 11a, forming part of the rod of the piston 26 in cylinder 27.

Fig. 1b shows the ports in the selector valve of Fig. 1a on a larger scale showing that the lands are broad enough to cover the ports d and e in the shell 11a.

Fig. 2 shows a steering wheel and the construction of these manual shifting means, especially to return the gearshift lever to neutral position, which neutral position however does not affect the position of the control valves, which are entirely controlled only by the longitudinal movement of the gearshift lever.

Fig. 3 shows in vertical, transverse elevation, the position of the main gearshift lever and the position of the mechanism, operated by the gearshift lever of Fig. 2 to effect a cross shift. It further shows in transverse section the mechanism whereby a longitudinal shift is made and simultaneously therewith the movement of the single control valve, controlling the gearshift. The lower end of the shift lever 37 is shown in Fig. 3a, which shows that the control lever 27a is located on both sides of the gearshift lever 37 proper. The fulcrum 37b of the control arm 37 is located at the extreme end of arms 37 and 37a, so that the motion of the lever 44a, connected to the upper end of the control arm 37a (of which the transverse pin 39 operates in a recess of the lever 37, which recess limits its motion with respect to lever 37) by arm or rods 44b, 38c, 38b, 38a (as shown in Fig. 1) is limited by the recess in shift arm 37, in which the transverse pin 39 of Figs. 1 and 3a moves.

The sliding valve 11b—c being now connected with the control arm 37a between the fulcrum 37b at the lower end of this arm, and the connection of rod 38a at the top-end of control arm 37a, it stands to reason that the control valve 11b—c moves by the motion of the lever 44a by hand in the same direction as the piston 26 will move the shift lever 37 by vacuum. As soon as the pin 39 hits the sides of the recess in the shift arm 37, its motion is stopped and the force by hand assists the motion of the piston 26 by vacuum, the latter piston receiving vacuum to the right of piston 26 when the top end of the lever 37a moves to the right. And reversely the left hand side of piston 26 receives vacuum when the lever 37a moves by hand to the left.

Fig. 4 shows in top view two shift rods and brackets connected therewith, to effect for instance four gear shifts, to reverse, low, second and high gear with a single lever. The lower end 36c of the gearshift lever actuating on the shift rods is shown in neutral position, and its connection to the piston rod 11a of the vacuum pump 27 for the gearshift is shown in top view, so that the various elements shown in Fig. 1 in a vertical plane are here shown in top view, at 90° to the plane of Fig. 1. See section line 4—4 in Fig. 3.)

Figs. 5 and 6 show the positions of the valve 15—17 during the end position of a longitudinal shift. And Fig. 7 shows a modification.

Fig. 8 is a modification of the shifting levers. Also Figs. 9 and 10. Fig. 11 shows diagrammatically from right to left, an engine, fluid drive, clutch, gearbox and rear axle in standard sequence, and an ignition system in combination with a gearshift system, controlled in part by the gearshift lever, in part by the accelerator, and in part by the pressure in the inlet manifold.

Fig. 12 shows diagrammatically a power transmission, and shows in the top part thereof, the shift rods 126, 127, controlling at the right end the interruption of the primary current of the ignition system of the engine 101 of Fig. 11. The said right end having been shown in Fig. 11, as described for Fig. 11 shortly.

Therebelow is shown a driving shaft 121, to the left, and an aligned shaft 123, having a bearing therein, and a countershaft 122a, parallel to these two aligned shafts. And gears in constant mesh on said three shafts to provide various forward drives and a reverse drive.

Fig. 12a shows the extreme right end of shift rod 126 (and 127) operating a switch to interrupt the primary current of the ignition, for the transmission of Fig. 12.

Fig. 13 shows a similar gear transmission, as Fig. 12, and shows again the drive shaft 121, aligned shaft 123 and a different type of countershaft 122b, and a freewheel $Z^1$, effecting a different set of forward drives than that of Fig. 12. The low and reverse shift of Fig. 12 is here omitted, as being the same as that shown in Fig. 12 on the same shafts. It shows further to the right in Fig. 12a, again the shift rod 126, the circuit 116 controlled again as in the Figure 11, by a switch 117 and accelerator, 104, or by a switch 116a or a switch 163a—b. The indentions b—c are only used here, because the shiftable unit $x^7$ has only 3 positions.

Fig. 14 shows diagrammatically an engine, fluid drive, two-way clutch, transmission and propeller shaft 123. The clutch pedal 153 operates and controls here a circuit of an electric starter, in cooperation with a motor, controlled by the vacuum of the engine 101. It further shows again the brake mechanism on the runner of the fluid drive, controlled by the accelerator 104, as shown in Fig. 11, and partially controlled by the shift rod 126, the right end of which is here connected with the switch 152, to control circuit 150 of solenoid 149. (In Fig. 11, the left end of shift rod 126 (or 127) controlled this circuit, which is irrelevant and merely a matter of diagrammatic representation of a system of control.) The electrical circuit of the starter is indicated by 156, and the two switches by 154 and 157.

Fig. 15 shows the same electrical circuit of Fig. 14, but indicated by 156a, for a different type of automatic starter. The two-way clutch mechanism 153 and the vacuum motor 158 (startix of appl. No. 676,646) control this circuit in substantially the same way.

Fig. 16 shows the shift rod members 126 and 126b of Fig. 13 with a different type of switch 116a, and different indentions n, o, p, as used with the transmission of Fig. 12.

Fig. 17 shows the same members 126 and 126b with similar indentions q, r, s, and similar switch 116a, which closes the circuit 116.

Fig. 18 shows a cross-section of the valve 148, operated by the solenoid 149, controlling a brake to be applied on the rotor of the fluid drive, as shown in Fig. 11 diagrammatically.

Fig. 1 is a general diagrammatic drawing of an internal combustion engine, a clutch, a gearbox and various devices to effect a combined disengagement of the clutch, a gear shift, and an engagement of the clutch. The elements thereof are as follows.

1 is an engine having an inlet manifold 2, a throttle 3 controlled by an accelerator 4. The inlet manifold 2 is connected by means of a check valve 2a (described in my previous applications) to a reservoir 5 of liberal dimensions, which is connected by a conduit 6 to a valve 7, and a valve 8 connected with the accelerator 4.

The conduit 6 is split in two conduits 6a and 6b, the conduit 6a being preferably controlled by both of said valves 7 and 8, and the conduit 6b being preferably controlled only by valve 7, for reasons to be explained later.

The conduit 6b continues into conduit 9 on the other side of the valve 7, and the conduit 6a continues into conduit 10 on the other side of both valves 7 and 8.

The conduits 10 and 9 are connected again on the other side of both valves, and continues as conduit 10a, which splits into conduits 10b, leading to valve 15, and a conduit 10c leading to a valve 11a—11b—11c. The conduit 10b connects to a valve 15, having a passage 16 on one side and a passage 16a on the other side, which is connected by a conduit 19 in slide valve 15 and a conduit 21—22 with a vacuum motor 23, having a cylinder 24 and a piston 25 and an atmospheric passage 26 on the left side of the piston. The piston 25 is connected by rods 27 and 28, and lever 29, to a fork 30 to operate the two-way clutch 32, the spring 31 forcing the clutch into engaged condition. 33 is a clutch pedal to operate the clutch manually, if preferred under certain traffic conditions.

The conduit 10c connects by means of a flexible hose with the passage 11 in the outer sleeve 11a. This outer sleeve has an inner sleeve 11b and an innermost sleeve 11c, for the vacuum, communicating with annular passage 12 therein, which communicates continuously with said first passage 11. Between the inner sleeve 11b and the innermost sleeve 11c, is an air passage 13b communicating with an air cleaner 13. To the right the innermost passage 11c communicates with a central passage c, and the air passage 13b communicates with two passages a and b respectively one on either side of the central vacuum passage c. The outer sleeve 11a has at its right end, two passages d and e, respectively communicating with chambers 26a and 26b on opposite sides of the piston 26 in the cylinder 27, actuating the gearshift by means of the outer sleeve 11a, which is connected by rods 40 to the lower end of the gearshift lever or transmission lever 37.

Returning to valve 15, the slide valve 15 therein has a lengthwise passage on the outer surface thereof 18, which communicates with a transverse passage 19, which communicates with another lengthwise passage 17 of greater length than that indicated by 18. If the slide valve 15 is substantially in neutral position as shown in Fig. 1, the vacuum passes from pipe 10b to port 16, passages 18, 19, 17 into conduit 21 to motor 23. During the entire longitudinal shift executed by lever 44a of Fig. 2, this communication is continued, but during the most extreme travel of each shift the passage 18 at the left end is placed just outside the reach of port 16 and the passage 17 establishes communication between the port 20 (or the port 20a to the left) in valve 15a, to admit atmospheric pressure to the motor 23 for the engagement of the clutch. The lost motion of the pin 39 in the hole 37c of arm 37 allows the driver to admit atmospheric pressure to reengage the clutch 32, and by moving the lever 44a slightly backwards or forwards from its (each) extreme position reached during any shift in low, reverse, second or third gear, to regulate and control the amount of air to the motor 24 to smoothen the clutch engagement as much as he wishes. It is merely a little trick to learn how, and after a few hours' practice the smooth engagement can be readily varied to traffic conditions.

Returning to valve 11a and 11b, if the sleeves 11b and 11c, forming one unit, is in neutral position as shown in Fig. 1, the vacuum enters the annular passage 12 and continues in pipe 11c towards the port c, intermediate the airports a and b in the sliding valve. In that position the vacuum cannot enter either chamber 26a or 26b, but only the air enters through the air cleaner 13 to passage 13a, and passage 13b located between the two tubes 11b and 11c, through ports a and b in sleeve 11b and d and e in the outer sleeve 11a, connected to the piston 26. The outer sleeve 11a is connected by articulated rods 40 to the lower end of the transmission lever 37, which is connected to a transverse rod 36 in the gearbox, by means of splines 36a as shown in Fig. 3. The arm 37 has a hole 37c, about midway its length, and in said hole extends transversely a pin 39, which is connected by a yoke 38a to the gearshift lever rods 38b and 38c, associated mechanically in some way with the gearshift lever 44a proper as will be explained later. The pin 39 is further connected with another yoke or auxiliary transmission operating lever 37a, as shown in Fig. 3, having a fulcrum on a pin 37b extending through the arm 37 at its extreme lower end as shown in Figs. 1a and 3a. The lower end of the yoke 37a, is connected at 41 by articulated rods to the two inner sleeves or tubes 11b and 11c. This rod 41 is bifurcated around the gearshift lever 37, the fulcrum 37b being between the shift arm 37 and the bifurcated control arm 37a and 41 at the lower end of arms 37 and 37a, as shown in Fig. 3a, and carries a shoulder 41a inside the sleeve 11a, and springs are located on either side of said shoulder, at 42, and 43, which springs retain the outer sleeve 11a and 11b+11c (as a unit) in neutral position, when the gearshift lever under the steering is left alone, by means of additional shoulders 41b, on either side of shoulder 41a on sleeve 11b.

The operating arm 37 is connected by articulated rods to the outer sleeve 44b of the gearshift lever 44a, as shown in Figs. 1 and 2. The sleeve 44b has two journal bearings at 50 and 49, rotating respectively in cups 51 and 52 of two brackets 53 and 54 fastened to the steering column 55, having a steering wheel 55a. The bearings 49 and 50 form a part of an arm 44, carrying a fulcrum 45 for the gearshift lever proper 44a. This lever 44a has to the left an eye 46, through which extends a rod 48, located inside the sleeve 44b, this rod having two shoulders 47a and 47b and two springs 47c and 47d, keeping this rod 48 and lever 44a in neutral position in a vertical plane. This rod 48 operates by a ball and socket 34 (see Fig. 3 again) on a bell crank 35, which has an arm having a fork working in a groove of the transverse rod 36, carrying to the right a lever 36b, of which the lower end 36c operates on the shift rods 56 and 57 shown in Fig. 4. Therefore the rod 48 executes the cross shift and is always operated exclusively manually. The lower end 36c of the lever 36b is shown in neutral position inside the indentions 56a and 59a of the brackets 58 and 59 attached to the shift rods 56, 57, as shown in Fig. 4, and the elements 36, 37, 37a, 37c, 38a discussed before, are shown in top view. The rods 40 are shown as connected to the outer casing 11a of the stem of the piston rod connected to piston 26 of the cylinder 27.

The operation of clutch and gearshift is as follows. Assuming the gearshift lever 44a to be in neutral position, as shown in Fig. 1, the springs 42, 43 hold the pin 39 substantially in the center of the hole 37c, and the air passage 13b communicates through passages a and b and d and e in sleeve 11a with both chambers 26a and 26b.

The rods 38b, 38c are also kept in exact neutral position, and the vacuum continues from manifold 2 through pipe 6, 6b, 7a, 9, 10a and 10b to port 16, passage 18, 17, 19, port 16a, conduit 21 and cylinder 24, keeping the clutch in disengaged position. Therefore, when shifting from neutral gearshift position, the clutch is always disengaged. When shifting towards low gear, the arm 38b moves to the left as indicated and the lower end of the arm 37a moves to the right, so that port c registers with port e, and vacuum prevails in chamber 26b. Port a registers with port d and atmospheric pressure prevails in chamber 26a, and the piston 26 moves to the right, assisted or followed by the hand and lever 44a to continue the valve condition obtained and described.

When reaching low gear position, the pin 39, on account of its lost motion is still adjacent the left end of the hole 37c, and the condition in pump 27 is not yet changed. If the lever 44a is, upon reaching the ultimate end of its longitudinal shift, slowly released, the spring 43 brings the pin 39 back to its neutral position, notwithstanding the fact that the lever 37 has been moved to the left to reach low gear position. When releasing the lever 44a gradually the ports a and b in sleeve 11b are moved again to neutral position as shown in Fig. 1, and air is admitted on both sides of the piston 26. This shift caused the slide valve 15 to move to the right in the sleeve 15a, upon which it reached the most extreme position shown in Fig. 5, in which the position of passage 17 is indicated by 17a, admitting the air to the passage 20 and to the motor 23, shutting off the vacuum. By moving the lever 44a slightly back, to release the compression of spring 43, the opening of the passage 17 registering with passage 20 is decreased and less air is admitted.

It is understood that the passages 18 and 17 may be so constructed that admission of vacuum and air may overlap each other a little during the initial movement of the last part of the longitudinal shift.

When releasing the lever 44a fully, the slide valve 15 is brought back to the position shown in Fig. 6, just cutting off the vacuum connection and just leaving enough air admitted to the pump. These ports should be designed in accordance with individual constructions.

Upon the next shift the lever 44a moves the rod 38c towards second gear and the valve 15 slides to the left by the lost motion movement of pin 39 in hole 37c of arm 37 and the passage 17 is placed out of communication with port 20, but passage 18 is placed back again in communication with 10b and the vacuum is again brought back to the motor 23. Upon further movement the lever 44a begins to feel the resistance of the pump 27, although the lever 37a has already placed port c in communication with port a and port b kept in communication with port e, so that vacuum prevails in chamber 26a and atmospheric pressure in chamber 26b. When the lever 44a passes neutral position on the way from first to second gear, there is no moment actually during which the pin 39 leaves the right end of the hole 37c, because the push of the hand holds it in that position when passing neutral. Even if the hand did relax momentarily the push, this would not engage the clutch again because port 18 remains fully in communication with port 16, and port 17 does not communicate with the port 20a to the left of port 16a yet, and all what happens is that momentarily the air may be admitted to both chambers 26a and 26b, until the hand by lever 44a pushes again the valves 11b and 11c to the left so that vacuum enters again chamber 26a, and atmospheric pressure in chamber 26b.

Upon reaching the extreme left position, it can be easily visualised from Figs. 5 and 6, that port 18 comes out of communication with port 16 and passage 17 comes in communication with air port 20a.

Upon moving the lever 44a slightly and slowly backwards (towards neutral again) the airport 20a and passage 17 are decreased in overlap, and the amount of air admitted to cylinder 24 can be perfectly controlled that way, regulating the rate of engagement of the clutch 32 by hand by means of the gearshift lever 44a.

The other gearshift into high is again similar to the gearshift into low, and the gearshift into reverse similar to that into second as far as the position of the valvular means 11a, 11b, 11c and 15 and 15a are concerned.

In Fig. 7 I have shown a modification in which in neutral position of the gearshaft lever 44a, as well as in the extreme positions at the end of the shifts, the vacuum is cut off from the cylinder 24.

The outer sleeve 15a has no air passages as shown in Figs. 1, 5, 6, but the inner sleeve is divided into two annular vacuum passages 17b and 18b by the intermediate annular bridge 19a. Inside these annular passages to transfer the vacuum from port 18 to port 16a during a shift to the pump 24, I construct an air passage 15b having three lateral arms, respectively f, g, h.

The operation of this arrangement is as follows, if the valve 7 is in the position shown in Fig. 1. If the lever 44a is in neutral position the passage, or arm g, of air passage 15b is in communication with passage 16a and conduit 21, engaging or keeping in engaged position the clutch 32, and the gears are in neutral. When shifting from neutral to first gear, annular passage 18b (the valve 15 moving to the right) establishes communication between ports 16 and 16a, and the clutch is disengaged. In the arrangement of Fig. 1, the driver can make a gearshift immediately because the clutch is kept in disengaged position. Not here, he has to shift slowly until the vacuum has disengaged the clutch, and then the vacuum can act in the other cylinder 26 to help him make the gearshift. When reaching the end of his gearshift to low gear, the port f registers with port 16a and the port 16 is closed. When moving the lever 44a slightly backwards, the driver can decrease the amount of air, slowing down the engagement of the clutch 32, as in Fig. 1. Shifting from low into second, the valve 15 moves to the left and port f is cut off and passage 18b establishes communication for vacuum from port 16 to 16a to disengage the clutch. As in the arrangement of Fig. 1, the gears being in mesh, the lever 44a cannot make the shift until the clutch is substantially disengaged, automatically synchronising the sequence of these two events.

When passing neutral position, passage port g comes in communication with port 16a and the cylinder 27 receives atmospheric pressure depending upon the speed of the shift. Usually the hand follows through so fast that the clutch 32 does not become engaged, and passage 17b continues to establish the communication between ports 16 and 16a. At the extreme end of the shift the port f comes in communication with the port 16a, and the clutch is engaged. Again the rate of engagement can be controlled by the backwards movement of the lever 44a.

The shift from second to high involves again the same elements and the shift from high to low, or reverse gear likewise.

In order to prevent that from neutral position the driver does not try too hard to engage the gears, before the clutch is disengaged, I may employ in the conduit 10c, leading to the shift cylinder 27, a valve 56 and 56a, which admits the vacuum to the shift cylinder only after the clutch is fully disengaged. This valve is likewise useful when shifting from any gearshift position to another in order to synchronise these two movements properly under all circumstances.

The advantage of the construction of Fig. 7 over Figs. 1, 5, 6, is that in neutral position the clutch is not kept disengaged, which throws too much of a load on the throw-out bearing of the standard clutch. Apart from this the arrangement of Fig. 1 is preferred.

The arrangement of Fig. 7 can be likewise combined with the control of the accelerator 4 and valve 8. If the valve 7 is raised, the valve 8a admits vacuum to the two cylinders only in idling position, and if the bridge 19a were missing in the valve 15 of Fig. 7, the clutch would be always disengaged when cutting off gas, and the gearshift lever being in neutral position. Therefore when using the valve 8, no disengagement of the clutch or assistance in a shift is obtained unless the accelerator is released substantially to idling position. It stands to reason that if the valve 7 is raised and the accelerator controls the master valve 8a—b, that the air passage 15b in valve 15 of Fig. 7 is not imperative, as we will see next.

If the valve 15, without passage 15b and arms f—g—h, is in neutral position, the clutch will stay for some time disengaged because the vacuum is suddenly cut off from cylinder 24. However, after a while the vacuum disappears and the clutch will gradually engage, depending upon the fit of the piston 25 in cylinder 24.

When shifting from neutral, the annular passages 17b and 18b come into play in the way explained and when reaching their ultimate positions, these annular passages continue to establish communication between ports 16 and 16a, and the accelerator, when stepped upon, furnishes air therein to re-engage the clutch by means of port 8b. The ports 18b and 17b should be merely somewhat lengthened or the stroke decreased. The drawback of this construction is again only that the clutch stays disengaged, or is disengaged, every time the pedal 4 is released, throwing a load on the throw-out-bearing of the clutch. Therefore it is clear that the main characteristic of the control of clutch and gearshift by means of the gearshift lever, can be executed in various ways. The valve 7 operated from the dash may have several positions. In the position shown it admits atmospheric pressure to pipe 10a through the passage 8a of the valve 8 and vacuum to pipe 9. One position lower it admits only atmospheric pressure to both branches 9 and 10 of pipe 10a. One position higher it admits only vacuum to the pipe 10 and 10a, and the pipe 9 is closed by the lower end of valve 7, and one position further it closes both pipes 9 and 10 (and therefore 10a).

The shifting levers 38c—b—a, 37a, 40 and 41, cause, of course, a slight relative movement of the rods 40 and 41 during the longitudinal movement of the lever 44a, and as soon as the piston 26 starts to move under the action of vacuum and the movement of the hand.

The hand has to follow with lever 44a the movement of the piston 26 in order to maintain the valve relation of the ports a, b, c, d, and e. However, if these ports are taken fairly liberal this relative movement is not a serious obstacle. However, if it is preferred to have a more accurate actuation of these levers, the modification of Fig. 8 can be applied. In this modification the rod 38b is again attached to the top end of the auxiliary lever 37a, which has the same pin 39 having lost motion in the hole 37c of the lever 37a. The lever 37a, however, is here pivoted around the center of the transverse rod 36 (operated by the cross shift rod 48, as we have seen) and the rods 40 and 41 are placed at exactly the same level by forming the rod 40 attached to the sleeve 11a by means of a yoke, and the rod 41, connected to the auxiliary shifting rod 37a, are connected to the inner sleeves 11b and 11c. The lever 37 is executed in duplicate as a yoke and each top end has a hole 37c in which the extreme ends of the pin 39 (attached to rod 38b) have lost motion. The auxiliary lever 37a is in between and pivots around the lever 37 and the transverse rod 36, to which the main lever 37 is splined. The two lower ends of the yoke 37 are attached by two articulated arms to the outer sleeve 11a, and the lower end of the intermediate auxiliary lever 37a, is attached by a single articulated rod 41 (all shown in dotted lines) to the inner sleeves 11b and 11c, forming a unit. Fig. 9 shows Fig. 8 at 90° angle (on a smaller scale) and shows the arm 37 in duplicate.

It does not matter in which position the main lever 37 is during any gearshift, the valves a, b, c, d, e, will be substantially in exactly the same position after the initial movement of the lever 44a until the pin 39 hits the ends of the hole 37c.

Other modifications of such a movement can be easily conceived once it is understood that the three positions of the selector valves 11a, 11b, 11c should coincide with the corresponding three positions of the piston 26 in the cylinder 27. Various variations of this triple position with various forms can be easily conceived, and any modification thereof or modifications of the basic principle of the clutch and gearshift in the proper sequence by a gearshift lever are supposed to fall under the scope of the appended claims. Although the present specification describes the principle in connection with the standard H-gearshift, it is understood that it can be applied on any other type. For instance a satisfactory simplification of the levers 37 and 37a, which is also quite satisfactory in practice, is shown in Fig. 10. The auxiliary lever 37a can be discarded entirely, and the 38b is connected with the top of the lever 37, and the rod 41 with the lower end of the lever 37. The arm 37 is again connected in the middle with the transverse shaft 36 by means of splines. The rod 41 is connected only to the inner valves 11b and 11c forming a unit, and the springs 42, 43 keep the valves a, b, c always in neutral position unless the hand pushes the lever 44a, compressing either spring 42, or 43. The movement of the valves 11b and 11c is merely limited by the compression of these springs and additional shoulders 41b, 41a, between the outer sleeve and the inner sleeves, so that after the initial actuation of the valves a, b, c, d, e, the hand moves also the piston 26 in the cylinder 27. In this arrangement the hand has to follow the piston ahead as in the others, only the friction of the valves 11a and 11b and the resistance of the springs 42 and 43 and the friction of the piston 26 in cylinder 27 determine the initial actuation of the valves. The tension of the springs 42 and 43 has to be less than the friction of the piston 26 in the cylinder 27, otherwise the valves a, b, c, d, e are not actuated properly. The friction of the piston 26 in cylinder 27 is greater, of course, than the friction of the valves 11a and 11b.

Now, I will describe another type of semi-automatic gearshift, in which always a fluid drive is involved, as described in my application 332,522 of April 29, 1940. Describing the parts in detail, the engine 101, has an inlet manifold 102, with a throttle 102a, controlled by the accelerator 104 and intermediate rod 103. The spark plugs 105 of said engine are connected with the distributor 106, connected to the circuit 107 and secondary coil 108, and ground 109.

The primary circuit 116, is grounded at 110, leading to a battery 111, from the battery the circuit 116 continues to a switch 117 controlled by the accelerator 104 (controlling the throttle 102a), and continuing from said switch to another switch 116a, controlled by a shift rod 126, which is controlled by the lever 44a (of the first ten figures) under the steering wheel (indicated by a line and two arrows leading from the bar 44b to the switch 163a—b, and to bar 44c to the shift rod 126), and continuing from said switch 116a to switch 163a—b, and from said latter switch, to the interruptor 112, the primary coil 113, the ignition key 114, and the ground 115. (The interruptor 112 is shown in full, although it is usually arranged below the distributor 106, at 112.)

The engine 101, has a crankshaft 118, connected to a fluid drive 119, the runner of which is connected by means of a shaft 120 to a two-way clutch 120a, said clutch connected to a shaft 121 extending into a transmission 122. In the top part of said gearbox, is the lever 44a (continued from 44a in left top part of Fig. 11) moving back and forth a shift rod 125 and a shift rod 126 (shown in miniature. The same shift rod 126 under the steering wheel) controlling the switch 116a (shown in miniature to the right thereof) controlling the circuit 116 of the primary circuit of the ignition. The left end of shift rod 126 is connected to a switch 152, controlling the circuit 150 for a solenoid 149, operating a valve 148, controlling the motor 145, which receives a fluid pressure (preferably hydraulic) from conduit 146, preferably from the lubricating system of the engine 101. This motor 145 controls a brake 144 on the clutch 120a, connected with the runner of the fluid drive 119. This circuit 150 is further controlled by a switch 151 connected with the accelerator, so that when the accelerator is released the switch 151 is closed, the solenoid 149 closes the valve 148, and the pressure from pipe 146 contracts the brake 144, stopping the clutch and runner. From the gearbox 122 extends rearwardly the propeller shaft 123, connected to the rear axle 124 and the wheels of a vehicle.

Before describing the purpose and the operation of the various parts discussed and described in Fig. 11, I prefer (for the sake of clarity) to describe first the transmission shown in Fig. 12, and after describing the location and parts and operation thereof, I will return to the parts of Fig. 11, and point out the particular relation thereof to the arrangement of the gearbox of Fig. 12.

There are two synchronising systems or means connected with this shift, of the gear transmission of Fig. 12. One for the freewheel shift from high to second and reversely, or from neutral, or intermediate, position to high freewheel drive, or second freewheel drive. And the other for the positive shifts from freewheel positions to the positive gear positions.

I will first describe the first system for the freewheel drives.

On the gear 128 is constructed at the right end a conical surface 136b, and on said external conical surface fits an internal, corresponding conical surface of a free floating ring 136a, having external dog clutches to mesh with those on ring X, or shiftable unit X. On the gear 131 is a similar external conical surface 140b, fitting a corresponding internal conical surface on a ring 140a, freely rotating thereon, said ring having dog-clutches externally to be meshed with the dog clutches 140 on gear 131.

The synchronising of the freewheel shift can be either done by means of the accelerator 104, operating the switch 117 in the circuit 116 of the primary current of the ignition system of the engine 101, as shown in Fig. 11, or it can be done by means of the switch 116a shown in Fig. 12a, associated with the shift rod 126, and 127, or it can be done by merely releasing the accelerator 104. Or it can be done by switch 163a—b, to be described later on.

Before describing these switches, I will first describe the action of the synchronising means shortly, when the accelerator is released. If the shifter arm 126a in Fig. 12 is in neutral, intermediate, position the drive is in low gear over the gears 132, 133 and the freewheel 133a.

When shifting from low-freewheel drive into second freewheel drive, all the driver has to do is to release the accelerator 104, so that the freewheel 133a operates, and he can shift the unit X, to mesh dog clutches 141 and 140.

When shifting from second freewheel to high-freewheel, he does the same thing, but the freewheel devices 133a, and Z, will operate simultaneously, when releasing the accelerator, 104.

Another method is to interrupt the ignition, as shown in Fig. 12a. I provide the shift rod 126, with four indentions $a$, $b$, $c$, $d$, which cooperate with a switch 116a, which closes the primary circuit 116, when the switch is pressed down, and breaks it when the upper end thereof is urged into said indentions by means of a spring. When the shift rod 126 is in neutral position, so that the pin $h$ is in the position $e$, between the two indentions $b$ and $c$, the circuit 116 (see further Fig. 11) is closed. When shifting with lever 44a (of Fig. 11) to second freewheel position, the pin $h$ of the switch 116a, falls first into the indention $b$, breaking the primary circuit 116, and subsequently rides out of it, when dog clutches 141 and 140 have meshed, re-establishing the primary circuit. With such a construction, the accelerator 104 does not have to be released in order to put the freewheels 133a and Z into function, the shifting mechanism does it just prior to shifting. (But if simultaneously released therewith, no harm is done, as we will see later in connection with a short circuit 116$^1$ and switch 116$^2$.)

Likewise when shifting from neutral to high-freewheel, or from high freewheel to second freewheel, either the accelerator can be released, or the indentions $b$ and $c$ operate on the switch 116a actuated by the shift rod 126.

In connection herewith, it should be pointed out that there should be some backlash between the lever 44a and the shift rods 126 (and 127), because before making the shift, the pressure between the teeth involved has to be released and the freewheel put into function for these freewheel shifts. I have two different methods, or means, for such a backlash.

The first one is shown in Fig. 11, right under the steering wheel, top left corner. The column 44b (moved rotationally by lever 44a) is one unit with a member indicated by 163a, and said member has internal splines into which fit the splines of another column 44c (which moves actually the lever 125 of Fig. 12) with a certain amount of backlash, or lost motion.

On the member 163a, I have an arcuate surface to the right provided with four indentions $a$, $b$, $c$, $d$, similar to those just discussed for Fig. 12a. When shifting with the lever 44a, the switch 163b, breaks the current of the ignition in the same way as the indentions on the rod 126. The same backlash is provided, so that the primary current is broken just before the actual shift from one freewheel position to the other takes place by the further shift of lever 44a.

The advantage to have the switch to break the primary circuit on the shifting column, is that we need only a single switch instead of two switches, one for each shift rod 126 and 127. Besides the pin 143 of Fig. 12 (extreme right side) can keep the shiftable units X and X$^1$ exactly in neutral position, as this is imperative in a narrow construction with short shifts.

Now I will describe the details of the gearbox 122, and thereafter I will describe the synchronised shift from freewheel positions to positive positions, in which likewise the two-way clutch 120a of Fig. 11 does not have to be disengaged before making a shift. With this synchronised shift, I use likewise the same switches and indentions $a$, $b$, $c$, $d$, on the shift rods 126, 127, or on the member 163a, as described for the freewheel shifts.

In Fig. 12 is shown the gearbox 122 of Fig. 11, in full. The gearshift lever 44a is connected to a column 44b, as shown in Fig. 11 and this column 44b is connected to a member 163a, which has a backlash arrangement with a column 44c, which actuates the shift rod 126 (and 127). On the member 163a are indentions, $a$, $b$, $c$, $d$, which operate a switch 163b in the primary circuit 116 of the ignition system of the engine.

The column 44c, inside the member 163a, upon rotation back and forth of the lever 44a, actuates the shift rods and gears by means of the lever, indicated by 125, which lever does not operate directly on the shiftable units in the gear transmission, but operates the arm 126a through a backlash arrangement as shown at 126b. Either this backlash arrangement, or the one in the steering columns 55b, 44c, has to be used for reasons already explained.

The transverse or cross shift has been already shown in Figs. 1 to 10, and is therefore omitted here.

The shaft 121 extends from the left into the gearbox 122, and another shaft 123 aligned therewith, has a bearing therein. Parallel to said shafts is a countershaft 122a, having four gears 129, 130, 132 and 134, respectively in constant mesh with the gear 128 on the shaft 121, and the gears 131, 133, and an idler reverse gear R in mesh with gear 135 freely rotating on shaft 123.

The gears 128 and 131, have respectively dog clutches 136 external, and internal 138, and 140 external, and 142 internal. Between these two gears is a shiftable unit X, shifted by the shift rod 126, and the lever 125. Said shiftable unit is composed of 4 main parts, the outer ring X, the internal shoe-brake W (operated by means of an intermediate pusher and spring and by the ramps $V^1$ and $V^2$ on the splines of shaft 123), the freewheel Z between the external ring X and the internal ring Y, splined and shiftable on the shaft 123, and the internal ring Y providing ramps for the freewheel Z.

The outer ring X has to the left an internal dog clutch 137 and one to the right 141, to be meshed respectively with the dog clutches 136 on gear 128, and 142 on gear 131, for respectively high-freewheel drive and second gear freewheel drive. The inner ring Y has at either end a dog clutch 139 and 143 to be meshed with the corresponding dog clutches 138 on gear 128, and 142 on gear 131, for respectively high positive gear and second positive gear.

To the right of gear 131 is another freewheel 133a between the members 133c (internal) and the member 133d (external). A bearing 133b of rollers, to the right of the rollers 133a of the freewheel, provides a centralising agent for the freewheel when it is overrunning. The member 133d has a dog clutch 133d at the right end thereof, and externally, and the internal member 133c has an internal dog clutch 133e. The reverse gear 135 is to the right thereof freely rotating on shaft 123, and the intermediate shiftable member $X^1$, has two dog-clutches $x^2$ and $x^3$ to the left and $x^4$ to the right.

Upon a shift of the unit $X^1$ to the left from neutral, the dog clutch $x^3$ engages the dog clutch 133e of the internal member 133c, so that the drive from gear 132, 133 is through the freewheel 133a to the shaft 123.

Upon a further shift to the left of the unit $X^1$, from the position in which it is shown, the dog clutch $x^2$ engages the dog clutch 133d on the external member 133d of the freewheel 133a, so that the drive is positive from gears 132, 133 directly to the shaft 123.

Upon a shift to the right of unit $X^1$, the dog clutch $x^4$ engages the internal dog clutch 135a of the gear 135 for reverse drive.

The shiftable unit $X^1$ has internal splines $x^5$ fitting the splines 123b, of the shaft 123.

Now I will describe the shift from freewheel positions to positive gear drives. With this shift the indentions $a$ and $d$ of the shift rod 126 of Fig. 12a come into play. Supposing the unit X is in second freewheel position, and the pin $h$ of the switch 116a is in position indicated by $f$, the circuit 116 being re-established. When the lever 44a shifts the rod 126 one notch further to the right, the backlash either of members 163a and 44c, first allows interruption of the circuit 116 and then the actual shift. This backlash is somewhat preferable to the backlash between rod 126 and the arm 126a as shown at 126b in Fig. 12, because if the shifter pin 143 (to the extreme right in Fig. 12) has fallen into the indention $k$ (see Fig. 12a or 12), center position, the unit X is held exactly in the middle, because the backlash is beyond the pin 143. If the backlash is made at 126b, the unit X has a little bit of freedom to move to the right and left, unless a spring or elastic relation is inserted between the rod 126 and the arm 126b, which could be done.

The operation of the synchronising mechanism for the shift from freewheel positions to positive gear positions has been already described in my application No. 184,904 (or for an equivalent mechanism in my Patent No. 2,181,541 of Nov. 28, 1939) and will be repeated here shortly.

The brake shoe W has below it a tough spring $U^2$ and a pin U in sliding contact with the groove $U^1$ in the splines 123a of the shaft 123. This groove $U^1$ has at either end a ramp, $V^1$ and $V^2$.

Upon the initial shift from neutral to a freewheel position, or from one freewheel position to another, said pin U does not reach the ramps $V^1$ and $V^2$, so that the brake shoe W is not actuated at all. Upon a further shift from freewheel positions, however, the pin U is shoved upon the ramp $V^2$ for high positive drive, and the pin U compresses the spring $U^2$, and forces the shoe W on the inside surface of the member X so that members X and Y rotate at the same speed temporarily.

Just prior to that shift, the pin $h$ of switch 116a of Fig. 12a, falls into indention $a$ and the ignition is interrupted shortly to slow down the engine, and to establish the overrunning action of freewheel Z. When this positive shift is finished the pin $h$ comes into position $f^1$ beyond the indention $a$ in rod 126.

For the shift from second freewheel to second positive drive, the pin $h$ and the indention $d$ comes into play, in cooperation with the freewheel $z$ and the pin U and ramp $V^1$. It is superfluous to explain this in detail.

When stopping the car, approaching a red signal in traffic, it is preferred to shift the rod 126 into neutral, so that low gear freewheel is engaged. By using the car brake, the transmission can be kept in low gear preventing creeping of the car on account of the fluid drive, but I will describe as shown in Fig. 14 a simple system, in combination with the present shifts, in which the accelerator, 104, automatically brakes the car, when in low gear.

Therefore with the present combination of the gear transmission of Fig. 12 with the arrangement of Fig. 11, it is possible to make all freewheel shifts from neutral by the lever 44a, and all shifts from freewheel position to positive gear drives by the lever 44a, and the shift rod 126, for low, second and high gear. Disengagement of the clutch 128a is entirely superfluous. This is only imperative for parking as we will see next. It is preferred, when shifting down from high, to go first into neutral, and from there to second gear. Shifting upwards, one can skip second gear, but in so far as the shift is so easy and quick, it is desirable but not imperative in the upshift, not to pass second gear. I effect these possibilities by making use of the fluid drive and brake system as explained in my prior application No. 332,522 in combination with my prior application No. 184,904 of Jan. 13, 1938.

When parking, the lever 44a must be used together with the two-way clutch 129a, and clutch pedal 153 (of Fig. 14), when shifting the rod 127 of Fig. 12 (and 13). When shifting the rod 127 entirely to the left, from the position shown, from freewheel low gear drive to positive low gear drive, the internal dog clutch $x^2$ of the shiftable unit $X^1$, comes in mesh with the external dog clutch 133d on the gear 133. The freewheel 133a is thereby locked out, if this is desired when parking. However, it is evident that this is not necessary. The only advantage of the positive low gear drive is, that even low gear can be used as a brake in Fig. 12, but this brake becomes imperative in the next construction or modification of Fig. 13, where a positive second gear drive is missing. This will be described later.

When shifting the unit $X^1$ in Fig. 12 to the right, low gear forwards is freed, and neutral position is attained. When shifting further to the right, reverse gear drive is engaged.

In the shift rod 127, I prefer to use only the indentions $c$ and $d$, as shown in Fig. 12a, to effect an easy shift by lever 44a only from freewheel drive to positive drive low gear. The reverse shift, however, is always done when the car is not moving, and the indentions $b$ and $a$ of shift rod 126, as shown in Fig. 12a, can be omitted for the rod 127.

Before describing in detail the brake mechanism indicated by the numbers 144 to 152 of Fig. 11 on the runner of the fluid drive, I will describe first the modification of another gear transmission of Fig. 13, differing from that of Fig. 12, in this respect that I have therein only a positive high gear and a second gear freewheel drive, besides the low freewheel and positive drives as already shown in Fig. 12 and not repeated therefore in Fig. 13. Likewise I will describe herein later, another switch 117, operated by the same accelerator 104, when it is pressed down beyond the wide open position of the throttle, as already described in Fig. 11 of application No. 332,522, but repeated herein for a similar semi-automatic gear-shift depending upon the use of a freewheel. Both constructions, the present one of Figs. 11 to 17 and that described in my application No. 332,522 use always a fluid drive in conjunction with a freewheel.

In Fig. 13 I have shown again the shaft 121 extending into the gear box 122, an aligned shaft 123 having a bearing in shaft 121, and a shaft 122b, a countershaft, parallel to said two aligned shafts.

The countershaft 122b has, however, the gear 129 loosely rotating thereon, except for a freewheel between said gear 129 and said shaft 122b. Said gear 129 has an outer bearing 122c in the gearbox 122, and an inner bearing 122d to the right thereof on the shaft 122b, having a bearing in the gear 129 itself, by means of a quill bearing or roller bearing, 122e.

Next to the bearing 122d for the gear 129, I insert rollers $Z^1$ for a freewheel, the ramps thereof, for the rollers, being constructed on the shaft 122b itself. Gears 130 and 131 etc. are arranged in the same way as in Fig. 12 and are supposed to be combined therewith and located to the right of the arrangement of Fig. 13.

The driving gear 128, carries a dog clutch 136, and on the extreme right end thereof, I arrange the conical surface 136b and a conical internal surface on a corresponding ring 136a, free to rotate thereon if not pressed thereon, and the driven gear 131 carries a dog clutch 140 to the left thereof, having similarly a conical surface 140b thereon, and a freely rotating ring with an internal, corresponding, conical surface 140a. Between said two gears 128 and 131, I arrange a member $x^6$ on the shaft 123, in fixed position thereon by any means, and splined on the outer surface of said member. On said member is splined another shiftable member $x^7$. The splines of this latter member, as in Fig. 12, are adapted to engage the freely rotating rings 136a and 140a upon a shift to the left and to the right, respectively. Upon meshing said members the difference in speed of the car, or on the shaft 123, and the shaft 121, causes said ring 136a to rotate on the conical surface 136b, but this action causes this ring to have a tendency to rotate with the speed of the shaft 121. The difference in speeds of these two shafts, cause a considerable friction between the said two conical surfaces (especially when the cone is not steep) and also between the splines of member $x^7$ and the splines or teeth on member 136a. Therefore the lever 44a will feel (or rather the driver will feel) considerable resistance until these two shafts have substantially the same rotational speed. At that moment the vacuum in the pump shifter of Figs. 1 to 10, will cause the shift into high positive gear almost automatically. This depends upon the size of the pump. Or if a hand-power and vacuum power shift is used, it depends upon the cooperative effort between hand and vacuum.

For the dog clutches or splines on member $x^7$, and the ring 140a on the gear 131, a similar effect takes place upon a shift of the member $x^7$ to the right, with this difference, however, that on a downshift from a given car speed, the engine speed should be increased instead of decreased, if said lower gear is a positive gear. It is here, where the freewheel $Z^1$ comes into play. Upon a downshift, when the gearshift lever 44a moves shift rod 126 to the left from high to second gear, the hump or button between the two indentions $b$ and $c$ of Fig. 12a, reestablishes, when passing neutral position in the shift, the current for the primary circuit of the ignition, and the engine picks up speed again. When passing neutral, the switch button $h$ (see Fig. 12a) is pushed down again and the primary current is again temporarily remade. When the shift is accomplished into second-freewheel position, the circuit 116 is again reestablished beyond indention $b$, and the shift is completed. The breakage of the current in the indention $b$ or $c$, should last long enough to bring the speed of the engine equal to, or below that of the car, corresponding to the second gear ratio between engine and car, otherwise the freewheel could not work. The shift from second gear freewheel up to positive high gear, is substantially the same as in the arrangement of Figs. 11 and 12, and substantially the same as described in my Patent No. 2,181,541, of November 28, 1939, and substantially the same as that of my application No. 184,904, because the synchronising means from a freewheel position to a positive gear operate here, in conjunction with a fluid drive, in substantially the same way as in the arrangement of Figs. 1 to 10, in which the two-way clutch is disengaged and engaged by the interruption of the ignition, but effected by the gearshift lever 44a.

These two transmissions of Figs. 12 and 13 can be equally combined with the various gear-shift arrangements of Figs. 1 to 10, using a fluid drive in conjunction with a two-way clutch or not.

In both constructions furthermore, when it is desirable at relatively high speeds to shift down from a higher gear to a lower gear, it has added advantage to break the primary current by the switch 117 connected with the accelerator (or the secondary circuit by similar switch 117e) as shown in Fig. 11.

In the arrangement of Fig. 12, as well as in that of Fig. 13, when driving at high speed, or uphill, the pressure on the engaged gears and dog clutches is great, and a substantial reduction in pressure is imperative. During the travel of the throttle from idling position to wide open position, the switch 117 does not break or ground the circuit 116, but does break it so long as the accelerator is opened past wide-open position. This should be relatively a short period, coordinated with the shift, and I will describe hereinafter a mechanism to prevent too long an interruption of the ignition, so that the engine cannot be killed accidentally.

For the arrangement of Fig. 12, in which we have two freewheel positions and two positive drive positions for the shiftable unit X, the accelerator can be used also for all shifts. It is a trick easily acquired, especially for the freewheel shifts and for the shift from a freewheel drive to a positive drive. From one positive drive into another it is a little harder, because the timing of pressure on accelerator and lever 44a has to be perfectly co-ordinated. Therefore the switch 116a, operated by the lever 44a, or the switch 163a—b operated thereby is highly preferable for lady drivers.

The second additional feature has to do with the feature I have already described in my application No. 332,522. To prevent the car from creeping, when coming to a full stop, I arrange an automatic arrangement controlled by the accelerator (preferably), so that all the driving can be done with the right foot and right hand, respectively on the accelerator and on the gearshift lever 44a.

Returning temporarily to Fig. 11. For that purpose I arrange the brake 144 on the shaft 121 and on shaft 120, so that when the clutch 120a is braked the gearbox is braked as well as the runner of the fluid drive. If the clutch is disengaged by foot or power, only the shaft 120 and the runner is braked. The brake 144 is actuated by a pump 145, receiving its pressure through pipe 146, from a source of oil-pressure, preferably the engine oil-pressure. From said pump 145, leads a drain pipe 147 to a drain valve 148, controlled by a solenoid 149, the circuit 150 of which is controlled by two switches, one, 151, controlled by the accelerator 104, when substantially in idling position, the other switch 152, controlled by either shift rod 126 or 127, or by both shift rods 126 and 127, with two switches 152.

When the drive is in freewheel low gear, the brake 144 may be applied every time the shift rod 126 is in neutral position, or so-called intermediate position, in which, as we have seen, the low-gear freewheel 133 and 133a is engaged. In the other gearshift positions of the shiftable unit X in Fig. 12, this brake should not be applied, because this is not annoying. In high or second gear we desire always to drive at a speed at least equal to minimum gas. And in positive gear, the brake 144 should not be applied under any circumstances, unless the clutch 120a is disengaged, of course. Therefore, I arrange the switch 152 in duplicate for shift rods 126 and 127, so that if the lever 44a is moved to exactly middle positions, the brake 144 does stop the runner, when the accelerator is released. When shifting out of that position, for either shift rod (for the reverse drive of shift rod 127), the switch breaks the circuit. The two positions indicated by 152a and 152b mean that if any positive drive in a forwards gear is engaged by either shift rod, the circuit 150 is broken.

The accelerator 104, when pressed beyond idling position, operates the switch 151, releases the brake 144, by breaking the circuit 150, so that the valve 148 is opened by the solenoid 149, the oil pressure disappears from pump 145, and the spring 145a in pump 145, releases the brake 144.

This arrangement is substantially the same for neutral or intermediate positions of the shift rods 126 and 127 for the transmission of Fig. 13. However, in so far as the second gear in this transmission is always in freewheel, and all the driving could be done between two gears, the switch 152 could be so arranged that the accelerator may apply the brake not only in low-gear freewheel but also in second-gear freewheel by means of a sliding switch.

In connection with these two foregoing features, I show a third additional feature in the Figures 14 and 15.

When we desire to do all the shifting in one plane, there is no real neutral position, unless we cross shift back to the other shift rod 127. And when the engine stalls, the two-way clutch 20a has to be disengaged to restart the engine. For that reason I connect the clutch pedal 153 in Fig. 14 on a fulcrum 153a, and the lower arm 153b thereof moves to the right, when the clutch 120a is disengaged. When disengaging the clutch the runner is free to move with the impeller, and I eliminate thereby the drag existing when you had otherwise to start the engine in gear, so that the braked runner would impede the impeller. In cold weather this is quite a drag and the battery has nowadays already enough of a load, with various other electrical appliances on a car.

The arm 153b is connected to the left with a switch 154 in an electrical circuit 156, of a starter 155. In this Fig. 14, I show a special well-known starter, but any other type of starter can be used in my arrangement. In said same circuit I have a second switch 157, connected with a servo-motor 158, operated by the vacuum in the inlet manifold 102 of the engine 101, so that when the engine is running, this motor opens the switch 157 and breaks the circuit 156, even if the switch 154 is closed, when disengaging the clutch fully. When, however, the motor 101, is dead, the motor 158 closes the switch 157, and the motor 101 is started by the motor 155.

Therefore the disengagement of the clutch, and a dead-motor cooperate to restart the dead motor.

In Fig. 15, I have a slightly different arrangement for another automatic starter, in which the pinion 155b of the starter 155a is engaged with the teeth on the flywheel by means of a solenoid 155c, operating when the circuit 156a is closed. Likewise here, I use two switches one, 154, operated by the clutch pedal, and the other 157, operated by the vacuum of the internal combustion engine.

In some modifications, a valve 159 may be placed between the motor 158 and the inlet manifold 102, which valve establishes, as second safeguard, the circuit by means of switch 157 only when the clutch is disengaged and the motor 101 dead. Between the motor 159 and the inlet manifold may be further placed a vacuum-reservoir 160, and a valve 161 between said reservoir and the engine 101, which opens in the direction of the inlet manifold, so that a blowback into the inlet manifold cannot start accidentally the starter motor 155.

Another modification of the switch 116a, operated by the shift rod 126 (127), to break the circuit 116 for the primary current slightly before, or substantially simultaneously with the gearshift, I have shown in Fig. 11 right below the steering wheel, upper left corner of Fig. 11.

Instead of controlling the breaking of the ignition by the shift rods, it has advantages (cheaper construction etc.) to construct this switch between the lever 44a and the shift rods. The lever 44a is connected to the column 44b, which is connected to a member, indicated by 163a, which member has the same indentions as explained for the shift rod 126 in Fig. 12a. This member has a backlash, or lost motion, with another column 44c, which actuates the shift rods, in which case the lost motion of these rods as shown at 126b is omitted in the constructions of Fig. 12.

When the lever 44a is initially moved by the driver, the indentions on member 163a break the current slightly before the actual shift, by means of a similar switch 163b, and re-establish them in the same way as the rod 126. The advantage of this construction is further, that there is no backlash or lost motion between the shift rod and the holding pin 143 in Fig. 12, so that the rods and the shiftable units X and X¹ are kept exactly in place, especially in neutral position. A spring, or any elastic arrangement between the rods 126, 127 and shifter arms 126a, 127a, may be applied, or between the member 163a and the column 44c, to establish a proper backlash or lost motion equally in both directions.

Another additional feature is shown in Fig. 11 by the elements $116^1$, $116^2$, $116^3$, $116^4$. In so far as the driver may push slightly and inadvertently too long on the lever 44a, or too long on the accelerator 104 controlling switch 117 (when pushing it beyond wide open throttle), the ignition may be cut off too long and the engine killed. To prevent this, I arrange a short circuit, $116^1$, either around the switch 116a controlled by the shift rods, or around the switch 163b controlled by the gearshift lever directly, or around the switch 117 controlled by the accelerator 104. In this short circuit $116^1$, I arrange another switch $116^2$, operated by a vacuum motor $116^3$, connected with a conduit $116^4$ to the inlet manifold 102 of engine 101.

When the primary circuit is broken inadvertently by the driver too long, and the engine is almost killed, the vacuum to the right of the diaphragm (or piston, or any movable member in said motor, delicate enough to move under a difference of fairly high vacuum and low vacuum), in the motor $116^3$ is so low that the spring therein will close the switch $116^2$ for the short circuit $116^1$ so that the switches 116a, 163b, and 117 (either one by itself or in combination) are cut out. As soon as the ignition is restored the engine picks up speed and the switches 116a, 163b and 117 are re-established in their function, and the gearshift can be made.

When making a shift, it is a good habit, to release always the accelerator, because the closing of the throttle, always increases the vacuum substantially almost from any motor speed, and the diaphragm in motor $116^3$ will always compress the spring and open the switch $116^2$ so that the short circuit is eliminated.

In so far as seldom a shift is made when travelling with idling engine, either in high, second or low, the short circuit is superfluous, but if a shift is made with released accelerator (idling position), the vacuum is always high enough to eliminate the short circuit.

In Fig. 16 is shown, that the indentions in the shift rods 126, 127 may be reversed, so that the switch closes the circuit 116, when pressed upwards by a spring, and breaks it when pressed downward. In that latter case, the spring effects the contact, and three indentions $n$, $o$, $p$, are imperative, for the arrangement of Fig. 12, if the ignition is cut off only for the shifts from freewheel to positive gear. If the ignition is cut off also for the freewheel shifts, five indentions are imperative.

In Fig. 17 I show the similar arrangement for Fig. 13, in which also three indentions $q$, $r$, $s$, are used on shift rod 126, for the shiftable unit $x^7$. There are only three positions for unit $x^7$, so that the number is always 3. For the shift rod 127, the indentions are only one or two, because for the reverse shift, the ignition is not cut off. A backlash, or lost-motion, relation between lever 44a and the shiftable units X and X¹ in Fig. 12, and $x^7$ and X¹ in Fig. 13, is desirable, because the hand pressure should be already on the unit to be shifted, so that upon cutting the ignition, the unit will be released during the short time that the retardation of the engine, in relation with car speed, effects a release or elimination of pressure between the gears or dog clutches involved.

Likewise, if the switch 163a—b is used, some kind of elastic, lost motion, or backlash relation between the lever 44a and that switch, has to be constructed for the same reason. Shifting pressure should exist already before the ignition is cut.

When using the accelerator 104 to cut off by means of switch 117 the ignition temporarily, when stepping on it beyond wide open position, the trick has to be learned or acquired to have the hand pressure already on the grearshift before stepping that hard on the accelerator. The lever 44a, when slightly pressed, opens the vacuum to the gearshift, so that the vacuum power in fact does exert already that pressure, but the hand has to follow up the vacuum force as explained for Figures 1 to 10.

It is evident that this gearshift of the Figures 10 to 17 is substantially similar or equivalent to that described fully in my application No. 128,368, of March 1, 1937. In said latter arrangement I use a two-way clutch, operated by power, and a vacuum gearshift, in such a combination that the gearshift cannot be started by vacuum unless and until the two-way clutch frees the engine from the transmission or the transmission from the rear axle, or from both (see the two clutches in Fig. 1 of parent application 676,646). And reversely the transmission cannot be re-connected to the drive, until and unless the gearshift is completed. I do here exactly the same thing, but use a fluid drive instead of a two-way clutch, because the breaking of the ignition and the re-establishing of the ignition, virtually frees the transmission sufficiently from the engine, to make any gearshift from a freewheel position to a positive drive and reversely, but not from and into one positive drive into and from another positive drive. The latter could be done by a skilled driver in a fluid drive as shown, just as well as when using a fluid drive, but it hardly could be called an automatic shift. The gearshift, furthermore, of the first ten figures is substantially the same and equivalent to that of the Figures 11 to 17, because the total gearshift, all the elements associated with said gearshift (i. e. the engine, two-way clutch or fluid drive, the gearshift itself in the gearbox) are controlled simultaneously and subsequently in proper sequence through proper intermediate fluid motors, by the gearshift lever 44a.

Furthermore, the synchronised shift for the freewheel positions is substantially the same and equivalent to that already disclosed by me in my application No. 656,240, of February 11, 1933, now abandoned.

Furthermore, the synchronised shift from the freewheel positions into the positive geardrive positions and reversely, is substantially the same and equivalent in the Figures 12 and 13 hereof, and already disclosed in my Patent No. 2,181,541 and in my application 184,904. The possibility of shifting automatically from and into these two kinds of drives, depends entirely upon the overrunning action of the freewheel involved. Without said freewheel the semi-automatic gearshift, controlled entirely by the gearshift lever 44a, cannot be a total success.

Furthermore in Fig. 12, the shift from the low gear drive directly into either high or second gear positive drive is only possible on account of the freewheel involved in the low drive.

Furthermore in Fig. 13, the shift from second gear to positive high gear is only possible on account of the freewheel involved in the second drive. Although this latter freewheel $Z^1$ is in another position than the freewheel Z of Fig. 12, in both shifts the automatic shift from a lower gear to a higher gear depends upon the overrunning action of the freewheel.

Various modifications can be easily conceived and fall clearly under the scope of the appended claims.

In the present application in Fig. 1, in case the valve 8a—8b is eliminated, the manual gearshift lever controls the clutch operation and the gearshift operation, as we have seen. In my prior application No. 128,368 the accelerator pedal, operated by foot instead of by hand, controls the clutch operation and the gearshift operation also, and in co-ordinated sequence. The variation does not amount to more than the Darwinian knowledge that at one time, our foot was more of a hand than it is today. Or rather it functioned as hand and foot at the same time. In application 128,368 it is further evident from Fig. 1, that if the two outer branches 4d and 4f of conduit 4b, controlled by the accelerator and valves 6a—6b, are placed slightly nearer to the center branch 4e, that the manually operated gearshift lever 13h of Fig. 12, would control the operation of the clutch by sending the vacuum to the motor 7, via the valve 15 of the gearshift motor 16, when initially moved by the said lever. By releasing the accelerator, and by means of a lost-motion between motor 16 moved by lever 13h and the gearshift rod, as shown at 127b, Fig. 12, in the present application, the gearshift lever 13h and the accelerator 6 control the clutch operation (simultaneously) exactly as in the present Fig. 1.

The freewheel devices used in the present gearboxes or those used in said Patent No. 2,261,898, would, after release of the accelerator, allow likewise the gearshift lever 13h to move the motor 15—16 in application No. 128,368, and thereby the valve 15b admitting vacuum to motor 7 to disengage the clutch before a gearshift.

Various modifications can be easily conceived, and are all supposed to fall under the fair scope of the appended claims.

The valvular means shown in Fig. 1 can be so modified that the vacuum or atmospheric through the passages 11c and 13b respectively are admitted in restricted amounts in order to effect a gradual movement of the piston 26, and gradual admission of vacuum and atmospheric pressure in the chambers 26a and 26b on opposite sides of this piston 26 effects a gradual gearshift.

In Fig. 1a, the passage 11c is identical with the passage 68 of Fig. 5 of Patent No. 2,261,898 aforementioned.

The passage 13b is identical with passage 63 of said patent. The bleed-passages 65 and 66 of old Fig. 5 communicating with passage 63 are indicated by 65 and 66 in Figure 1a, and similar bleed passages for the vacuum connection are indicated by 68a, if it is desired to use them in certain mechanisms, requiring an initial movement, which is slow relatively. The outer shell of the valve is 11a, and the inner sliding valve is a double concentric tubing affair, 11b and 11c. In 11a are ports d and e. The central passage for vacuum is c. The ports a and b are the atmospheric ports in the sliding valve 11b—11c, as in Fig. 1.

It is understood, of course, that the vacuum and atmospheric may be reversed, if desired.

It stands to reason that the narrow passages 65 and 66 (or 68a) are very efficient in starting a slow shift, which is increased in speed if the lever 44a is pressed harder, because in that case the full opening of ports 67 and 64 come into play, and either full atmospheric pressure or full vacuum is admitted from the moment that the wider ports come directly under the ports d and e of the shell 11a. I have indicated and shown at 69, a small (narrow) land on the slide valve 11c, between the bleeding or strangulation passages 65 and 66, and 68a, to show that the full diameter of the inside of the shell 11a may be maintained on either side, the vacuum or the atmospheric side. Therefore these short lands do not indicate that in the neutral position of the valvular means, or sliding valve rather, both vacuum and atmospheric pressure may communicate with both chambers 26a and 26b. In neutral position it is preferred to have the atmospheric pressure communicate with both the chambers 26a and 26b, in order to balance the pressure on the piston and on the valvular means, or both.

If a differential pressure is used on either side of the piston, both pressures could, of course, communicate simultaneously with both chambers 26a and 26b in neutral position. And either pressure could be strangulated initially, or only one of the two pressures, higher or lower.

It is understood that both arrangements of Figs. 1 and 1a may be applied as a servomotor or an auxiliary motor to move any mechanism, which requires movement by power, or mechanical assistance in addition to hand or foot-power.

I claim:

1. In a combined hand and power operated gearshift, a gearshift motor having a single piston, a main gearshift lever to actuate said gearshift, an auxiliary lever pivoted on said main lever, said auxiliary lever actuating a control valve associated with the piston rod of said single piston, said control valve having a single vacuum connection, and a single atmospheric connection, and passages associated therewith to admit vacuum and atmospheric pressure alternatively on either side of said piston, and atmospheric pressure simultaneously to both sides of said piston when cutting off the vacuum, said gearshift connected by a two-way clutch to a transmission, said gearshift lever controlling pneumatic mechanism to operate said clutch.

2. The combination with a source of vacuum, a vacuum operated clutch, a control valve for said clutch, a vacuum operated gearshift, a control valve for said gearshift, both of said valves being initially actuated by a gearshift lever operating manually a gear transmission, the gears in said transmission when transmitting power, preventing the control valve of the vacuum motor of the gearshift from effecting a gearshift before the control valve of the clutch motor has effected a disengagement of the clutch, said gearshift lever, manually controlled, controlling the rate of engagement of said clutch by a backward movement from the movement which caused the gearshift.

3. The combination of a prime mover, and a gear transmission, a longitudinal shift therein made by vacuum power controlled by a gearshift lever, a cross shift therein executed only by said gearshift lever by hand power, said lever controlling vacuum power to disengage a two-way clutch between said prime mover and transmission before said gearshift is made.

4. In an automobile, a source of vacuum from an internal combustion engine controlled by an accelerator, said source operating a two-way clutch between said engine and a transmission, and operating a gearshift in said transmission, said two mechanisms, clutch and transmission, operated in co-ordinated movement by a single gearshift lever manually controlled, said gearshift selecting and associating gears in a plurality of ratios by means of shift rails and actually engaging said shift rails with said lever, said accelerator controlling substantially in released position the vacuum to be admitted to the motor for said clutch operation and to the motor for said gearshift, and valvular means under control of the operator to cut off said vacuum from said motors so that the accelerator has not any longer control over it.

5. In an automotive vehicle provided with an engine, two-way clutch and a transmission having a gearshift lever, power operated means for operating said lever to select either a second or high gear setting of the transmission together with manual assistance from the driver to shift said gears, said power means comprising a double acting vacuum operated actuator operably connected to the shift lever, and valve means for selectively controlling the operation of the actuator, said gearshift lever operating a valve which controls said two-way clutch which connects said transmission to said engine.

6. In an automotive vehicle provided with an engine, two-way clutch and a transmission having a shift lever, power operated means for operating said lever to select either a second or high gear setting of the transmission, together with manual power from the driver to effect said second and high gear settings, said power means comprising a double acting vacuum operated actuator operably connected to the shift lever to insure either a second or a high gear, or a reverse and a low gear operation of the transmission, three way valve means for selectively controlling the operation of the actuator, and means to control said valve mechanism from the driver's compartment, said gearshift lever controlling a valve which controls said two-way clutch which connects said transmission to said engine.

7. In an automotive vehicle, an engine, and accelerator, a two-way clutch connecting said engine to a gear transmission, a gearshift lever manually operated by the driver of the vehicle, and actually shifting gears therein, a vacuum motor to assist the driver in a manual gearshift in said transmission, said gearshift lever controlling, however, the admission of vacuum and atmospheric pressure, or only atmospheric pressure, to the gearshift motor before said motor can operate, and during said shift, in combination with a vacuum motor to operate said clutch, said latter vacuum motor under control of said same gearshift lever, said accelerator controlling the vacuum to both of said motors so that the vacuum is admitted thereto when said accelerator is released.

8. In an automatic gearshift transmission, an engine, and accelerator connected by a two-way clutch to a gear transmission, a vacuum motor to shift gears in said transmission, a gearshift lever operatively associated with a manual gearshift in said transmission and actually shifting gears therein, and controlling the admission of vacuum and atmospheric pressure, or only atmospheric pressure, to said vacuum motor before it can operate and during said shift, said motor comprising a single piston and a single cylinder, said gearshift lever being further adapted to connect said motor with each of two gearshift rods in said transmission so that said vacuum motor can effect a plurality of gearshifts, in combination with another vacuum motor to operate said clutch, said clutch admitting however the vacuum to said first motor when it is disengaged, said clutch motor being also under control of the same gearshift lever, said accelerator controlling the vacuum in a pipe leading from the inlet manifold of said engine to both of said motors, only when said accelerator is released.

9. A selector valve comprising a cylindrical shell, having two ports therein, and a sliding valve therein, which has an inner passage therein, said sliding valve capable of assuming three positions in said shell, said selector valve being connected to two sources of fluid pressure which have a differential, said sliding valve establishing connection between said two sources of fluid pressure and said two ports respectively in the left position, and establishing said same connection in the right position but in reverse combination, and establishing connection between only one source of fluid pressure and both of said ports in intermediate position, between said right and left positions, said selector valve in combination with a power operated gearshift, a prime mover and a gear transmission, a power operated clutch therebetween, a gearshift lever to shift said gears in said transmission, said gearshift lever controlling and actuating said selector valve for the shifting of said gears and another valve for the disengagement of said clutch before the shifting of said gears and the engagement of said clutch after the shifting of said gears in the proper sequence.

10. The combination of a hand and power operated gearshift with a control valve whereby the vacuum and atmospheric pressure is admitted by means of said control valve alternately on either side of a single piston in a vacuum cylinder operating said gearshift, said control valve admitting atmospheric pressure on both sides of said piston when it reaches the intermediate or half-way position in a back and forth motion in one plane, so that the said piston is brought to rest and equilibrium, combined with mechanism associated with a gearshift lever whereby the initial movement of said lever actuates a valve controlling the vacuum to a vacuum motor, disengaging and engaging a clutch between an engine and said gearshift, said manually operated gearshift lever controlling the gearshift motor before and during a shift.

11. The combination of a hand and power operated gearshift with a control valve whereby the vacuum and atmospheric pressure is admitted by means of said control valve alternately on either side of a single piston in a vacuum cylinder operating said gearshift, said control valve admitting atmospheric pressure on both sides of said piston when it reaches the intermediate or half way position in a back and forth motion in one plane, so that the said piston is brought to rest and equilibrium, combined with mechanism associated with a gearshift lever whereby another control valve is actuated simultaneously with said control valve for said gearshift, said other control valve admitting vacuum to a clutch-vacuum-motor, said latter valve continuing to admit vacuum to said latter motor when said gearshift lever assumes a neutral position intermediate two gearshifts, and whereby in said neutral position the vacuum is cut off from the vacuum motor for the gearshift, said manually operated gearshift lever controlling said gearshift motor before a shift and during a shift.

12. A control valve for a vacuum operated gearshift pump, consisting of a cylindrical shell, having two ports therein connected respectively with the opposite chambers formed by a single piston in a cylinder of said pump, a sliding valve therein, said sliding valve having a single atmospheric connection and a single vacuum connection, said atmospheric connection extending to the outer end of said sliding valve and communicating by means of said sliding valve and said ports in said shell alternatively with said opposite chambers in said cylinder when said slide valve is moved from intermediate position, and communicating with both of said chambers when said valve is moved to an intermediate position, and said vacuum connection alternatively communicating with said opposite chambers in said cylinder through said ports in said shell when said valve is moved from said intermediate position, and strangulation or bleeding passages from either one of said atmospheric or vacuum connection to said ports in said shell, in order to admit either slowly atmospheric pressure, or vacuum, to either one of said chambers respectively in said cylinder.

13. The combination of a power actuator with a control valve, said actuator comprising a cylinder closed at both ends, a double acting piston in said cylinder and a chamber on each side of said piston, said control valve composed of a shell and a slide valve, said shell having two ports therein communicating respectively with said two chambers, said slide valve having two passages, a vacuum passage and an atmospheric passage concentric with each other, said vacuum passage in neutral position of said slide valve admitting atmospheric pressure to both of said cylinder chambers, while cutting off the vacuum from both of said chambers, strangulation passages between said ports in said shell and said atmospheric passage when said valve is moved slightly from neutral position, said slide valve when moved from neutral position fully admitting full vacuum to one chamber and full atmospheric pressure to the other chamber.

14. The combination of a power cylinder to move mechanism and a selector-valve, said selector valve composed of a shell with two ports communicating respectively with two chambers on opposite sides of a single piston in a single cylinder, said selector valve having a vacuum and an atmospheric connection, a sliding valve in said shell, said sliding valve distributing vacuum and atmospheric pressure to said chambers, said sliding valve in neutral position admitting atmospheric pressure through bleeding passages to both chambers, said sliding valve when moved from neutral position initially admitting full vacuum to one chamber and bleeding atmospheric pressure to the other chamber until the slide valve is moved fully from neutral position, said sliding valve when moved in opposite direction admitting initially strangulated air to one chamber and full vacuum to the other in reverse order, and full air and full vacuum when moved fully from neutral position.

15. The combination of a power cylinder, operating under a differential pressure of a lower and higher pressure source, on opposite sides of a single piston in a single cylinder thereof, with a selector valve, composed of a shell and a sliding valve inside thereof, said shell having two ports communicating respectively with the two chambers on opposite sides of said piston, said slide valve having three positions, a neutral position and two positions in opposite direction thereof, said slide valve admitting to one of said ports strangulated higher pressure when moved from said neutral position initially, and admitting said lower pressure fully to the other port, and reversing said conditions for said ports when moved initially from neutral position in the opposite direction.

J. A. H. BARKEIJ.

REFERENCES CITED

The following references are of record in the file of this patent:

UNITED STATES PATENTS

| Number | Name | Date |
| --- | --- | --- |
| Re. 20,685 | Burtnett | Apr. 5, 1938 |
| 861,805 | Camp | July 30, 1907 |
| 1,010,054 | Irish | Nov. 28, 1911 |
| 1,219,334 | Lower | Mar. 13, 1917 |
| 1,830,636 | Bragg et al. | Nov. 3, 1931 |
| 1,958,607 | Burtnett | May 15, 1934 |
| 1,993,015 | Moorhouse | Mar. 5, 1935 |
| 2,030,838 | Hill et al. | Feb. 11, 1936 |
| 2,069,526 | Kesling | Feb. 2, 1937 |
| 2,073,692 | Griswold | Mar. 16, 1937 |
| 2,076,362 | Boldt et al. | Apr. 6, 1937 |
| 2,081,527 | Breese | May 25, 1937 |
| 2,084,153 | Linsley | June 15, 1937 |
| 2,084,219 | Salerni | June 15, 1937 |
| 2,102,755 | Sinclair | Dec. 12, 1937 |
| 2,104,608 | Cox et al. | Jan. 4, 1938 |
| 2,113,860 | Sanford et al. | Apr. 12, 1938 |
| 2,115,097 | Durham | Apr. 26, 1938 |
| 2,152,914 | Price et al. | Apr. 4, 1939 |
| 2,169,216 | Bloxsom | Aug. 15, 1939 |
| 2,177,459 | Price | Oct. 24, 1939 |
| 2,200,013 | Sanford | May 7, 1940 |

(Other references on following page)

UNITED STATES PATENTS

| Number | Name | Date |
|---|---|---|
| 2,212,442 | Kliesrath et al. | Aug. 20, 1940 |
| 2,212,955 | Price et al. | Aug. 27, 1940 |
| 2,214,100 | Claytor | Sept. 10, 1940 |
| 2,214,819 | Kiep et al. | Sept. 17, 1940 |
| 2,219,323 | Kliesrath | Oct. 29, 1940 |
| 2,226,801 | Black | Dec. 31, 1940 |
| 2,227,412 | Stortz | Dec. 31, 1940 |
| 2,234,463 | Brewer | Mar. 11, 1941 |
| 2,241,071 | Price | May 6, 1941 |
| 2,254,334 | Vincent | Sept. 2, 1941 |
| 2,257,674 | Dunn | Sept. 30, 1941 |
| 2,261,898 | Barkeij | Nov. 4, 1941 |
| 2,275,944 | Breese | Mar. 10, 1942 |
| 2,281,159 | Kliesrath et al. | Apr. 28, 1943 |

FOREIGN PATENTS

| Number | Country | Date |
|---|---|---|
| 442,843 | Great Britain | May 10, 1934 |